United States Patent [19]

Kumagaya et al.

[11] Patent Number: 4,975,733
[45] Date of Patent: Dec. 4, 1990

[54] ROTARY CAMERA

[75] Inventors: Hirohumi Kumagaya; Yoshikazu Konaya; Morio Ishiwatari; Tatsuya Emoto, all of Ayase, Japan

[73] Assignee: Fuji Photo Film Co., Ltd., Kanagawa, Japan

[21] Appl. No.: 384,389

[22] Filed: Jul. 25, 1989

[30] Foreign Application Priority Data

Jul. 26, 1988 [JP] Japan ................................ 63-184480
Jul. 26, 1988 [JP] Japan ................................ 63-184481
Jul. 26, 1988 [JP] Japan ................................ 63-184482
Jul. 26, 1988 [JP] Japan ................................ 63-184483
Jul. 26, 1988 [JP] Japan ................................ 63-184484

[51] Int. Cl.$^5$ ...................... G03B 27/48; G03B 27/50; G03B 27/70
[52] U.S. Cl. ...................................... 355/49; 355/64; 355/76
[58] Field of Search .................... 355/47–49, 355/76, 64

[56] References Cited

U.S. PATENT DOCUMENTS 3,547,535 12/1970 McLean et al. ................ 355/76 X

Primary Examiner—Richard A. Wintercorn
Attorney, Agent, or Firm—Sughrue, Mion, Zinn, Macpeak & Seas

[57] ABSTRACT

A rotary camera for photographing an original image on a document sheet so that a photographed image is formed on a frame of a microfilm roll. The document sheet is fed from a document feed port onto a rotary drum which comprises a hollow cylinder having an outer periphery provided with multiple small through-holes and suction means for sucking air through the multiple through-holes so that at least a zone of the document sheet exposed to photographing light is closely fitted over the outer periphery of the hollow cylinder. The photographed document sheet is stripped from the hollow cylinder by document stripping means disposed downstream of the suction means and then discharged through a document discharge port. Preferably, a buffer zone is provided between the suction means and the document stripping means to facilitate smooth stripping and preventing folding of the document sheet. The document feed port and the document discharge port is disposed through the front wall of the casing so that the operator can feed the document sheet while observing the image-bearing face of the document sheet. A film unit containing therein a microfilm roll is mounted on the rear side of the top wall of the casing and an optical system for passing the image-bearing light to the film unit is disposed rearward of the rotary drum, so that there is no risk that the image-bearing light is interfered by the lights entering from the document feed and discharge ports.

10 Claims, 5 Drawing Sheets

ROTARY CAMERA

BACKGROUND OF THE INVENTION

1. Field of the Invention

The present invention relates to a rotary camera for photographing an original image on a document sheet so that the photographed image is formed on a frame of microfilm roll. In operation of such a rotary camera, the microfilm is taken up at a rate which is reduced at a predetermined ratio to the moving speed of the document sheet that is conveyed by an appropriate conveying system.

2. Prior Art Statement

In the conventional rotary cameras of this type, the document sheet is conveyed through a passage which is formed by an assembly composed of a number of rollers and/or belts. However, the conventional system has inevitable problems that the sheets are not always inserted smoothly in-between the rollers or belts to cause jamming, breakdown, warping, crimping or skew of the sheet. These malfunctions often occur particularly when the thickness of the supplied document sheet is thin or the size thereof is relatively small. In addition, some kinds of sheet material are apt to be charged with static electricity and thus arise a problem that the smooth conveyance and discharge of the document sheet becomes more difficult.

The rollers or belts used in the conventional system are made of materials which are abraded during the long time use. As the progressive abrasion of rollers and/or belts, slippage of document sheets takes pace leading to undesired change in conveying speed. In such a case, the film conveying rate cannot be synchronized with the take-up speed of the film so that the quality of photographed image on the film is deteriorated.

Another disadvantage of the conventional system is that the roller and/or belt assembly is complicated so that the image-bearing light must be passed through an optical path of delicate and elaborate design in order that it is not interfered or obstructed by any one of the rollers or belts of the conveyor assembly. Particularly when the optical path is vicinal to the document feed port generally positioned at the front side or on the top face of the casing, there arises a problem that lights tend to enter from the document feed port. In order to prevent entrance of lights from outside of the casing, the casing should have a complicated shielding structure.

The conventional system has a further disadvantage that it is difficult to design a long light path without particular complication, leading to the result that the size of the total system becomes too large to ensure a long light path.

On the other hand, it is desirous that the document sheet is inserted into the system while observing the face on which the original image to be photographed is present.

OBJECTS AND SUMMARY OF THE INVENTION

A principal object of this invention is to overcome the aforementioned disadvantages of the conventional system, and more particularly to provide a rotary camera for photographing an original image on a microfilm, in which the document sheet is conveyed stably without causing disorders such as jamming, breakdown or crimping to improve the quality of photographed image stored in the microfilm.

More specifically, the object of this invention is to provide a rotary camera, in which the take-up speed of the microfilm roll is synchronized with the conveyed speed of the document sheet in such a manner that the microfilm roll is begun to be wound with a slight time lag after the document sheet is fed to and conveyed by the conveyor drum and stopped likewise with a slight time lag after the completion of photographing of the document sheet, the conveyed speed of the document sheet being held stable even after the laspe of long use time. The film take-up speed is maintained at a pre-set reduction ratio relative to the conveyed speed of the document sheet, and may be properly set by the operator of the system.

Another object of this invention is to provide a rotary camera for photographing an original image on a microfilm, which can be operated smoothly without the fear of the disorder that discharge of the document sheet is disturbed by static electricity.

A further object of this invention is to provide a rotary camera for photographing an ordinal image on a microfilm, in which the optical system is disposed at a location remote from the document feed and discharge ports so that entrance of lights from outside of the casing is obviated.

A further object of this invention is to provide a rotary camera for photographing an original image on a microfilm, in which a relatively long light path is defined in a small size casing by the effective use of the space in the casing.

A still further object of this invention is to provide a rotary camera for photographing an original image on a microfilm, to which a document sheet can be fed while observing the face on which an original image to be photographed is present.

The object of this invention is achieved by the provision of a rotary camera for photographing an original image on a document sheet so that a photographed image is formed on a frame of a microfilm roll, wherein the initiation and termination of take-up of the microfilm roll is synchronized with the initiation and termination of photographing of the document sheet and wherein the microfilm take-up speed is maintained at a pre-set reduction ratio relative to the conveyed speed of the document sheet, an improved rotary camera which comprises:

(a) a rotary drum for conveying said document sheet and rotating at a certain circumference speed;
(b) a film unit containing therein said microfilm roll; and
(c) an optical system for exposing said image on said document sheet to light and leading the image-bearing light through an optical path onto said frame of said microfilm roll;

said rotary drum comprising:

(i) a hollow cylinder having an outer periphery provided with multiple small through-holes; and
(ii) suction means for sucking air through said multiple through-holes so that at least a zone of said document sheet exposed to light is closely fitted over the outer periphery of said cylinder.

Document stripping means may be disposed downstream of said suction means for blowing air through said through-holes to strip said document sheet from the outer periphery of said cylinder.

Also, buffer means may be disposed downstream of said suction means and upstream of said document stripping means, said buffer means defining a zone within which passage of air through said multiple through-holes is restricted.

The further object of the invention is achieved by the provision of a rotary camera for photographing an original image on a document sheet so that a photographed image is formed on a frame of a microfilm roll, wherein the initiation and termination of take-up of the microfilm roll is synchronized with the initiation and wherein the take-up speed of the microfilm roll is maintained at a pre-set reduction rate relative to the circumferential speed of the document sheet, an improved rotary camera which comprises:

(a) a casing of substantially rectangular parallelepiped shape and having top, bottom, front, rear and side walls;
(b) a rotary drum disposed adjacent to the front wall of said casing for conveying said document sheet while retaining the document sheet closely sticking to the outer periphery thereof;
(c) a film unit containing therein said microfilm roll, said film unit being mounted on the rear side of the top wall of said casing; and
(d) an optical system for exposing said image on said document sheet to light and leading the image-bearing light through an optical path onto said frame of said microfilm roll, said optical system being disposed in said casing at a position below said film unit and rearward of said rotary drum;
whereby said document sheet is supplied and discharged from the front side of said casing and the original image thereon is photographed when it comes to a position on rear half arc of said rotary drum.

By disposing the optical system at a position remote from the document feed and discharge ports, the optical system is not disturbed by the lights entering from the outside of the casing without the need of complicated shielding structure.

According to a still further aspect of this invention, the optical system includes a first reflector disposed at the upper rear corner on said casing, and a second reflector disposed beneath said film unit and at the lowest location in said casing, said image-bearing light being passed from the surface of said document sheet through said first reflector and then through said second reflector into said film unit. With this construction, sufficiently long light path is provided within a relatively small casing.

The further object of this invention is achieved by the provision of a rotary camera for photographing an original image on a document sheet so that a photographed image is formed on a frame of a microfilm roll, wherein the initiation and termination of take-up of the microfilm roll is synchronized with the initiation and wherein the take-up speed of the microfilm roll is maintained at a pre-set reduction rate relative to the circumferential speed of the document sheet, an improved rotary camera which comprises:

(a) a casing of substantially rectangular parallelepiped shape and having top, bottom, front, rear and side walls;
(b) a rotary drum disposed adjacent to the front wall of said casing for conveying said document sheet while retaining the document sheet close to the outer periphery thereof by suction force;
(c) means for feeding said document sheet to said rotary drum so that the leading end of document sheet abuts against the uppermost periphery of said rotary drum;
(d) a film unit containing therein said microfilm roll, said film unit being mounted on the rear side of the top wall of said casing; and
(e) an optical system for exposing said image on said document sheet to light and leading the image-bearing light through an optical path onto said frame of said microfilm roll, said optical system being disposed in said casing at a position below said film unit and rearward of said rotary drum;
whereby by said document sheet is supplied with the image-bearing face held upside and discharged from the front side of said casing and the original image thereon is read when it comes to a position on rear half arc of said rotary drum.

DESCRIPTION OF PREFERRED EMBODIMENT

A presently preferred embodiment of this invention will be described in detail with reference to FIGS. 1 to 5.

Figure 4:
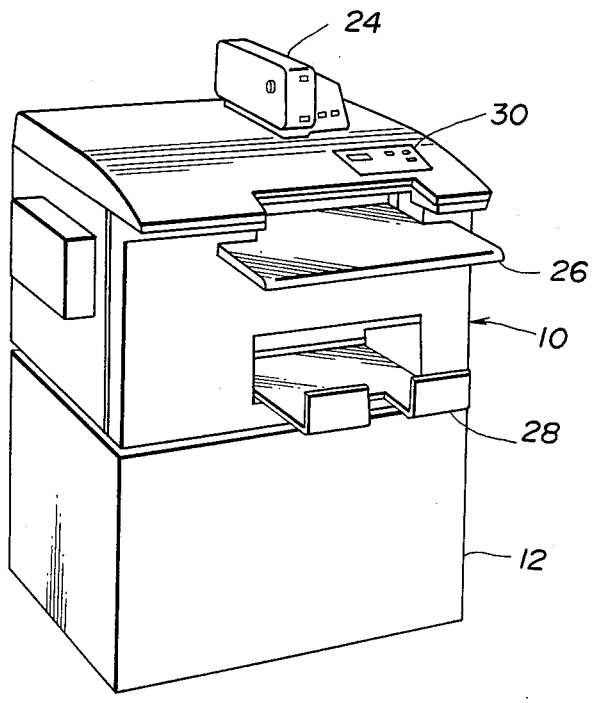
FIG. 4 is a perspective view showing the exterior appearance of the overall system.
Figure 5:
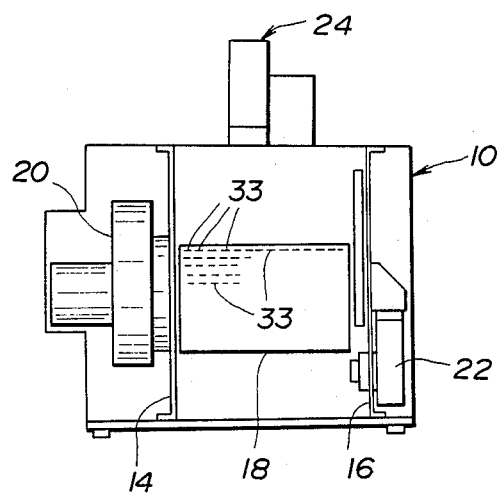
FIG. 5 is a front view showing the arrangement of the rotary drum and associated parts.

Initially referring to FIGS. 4 and 5, a casing 10 is placed on a desk 12. The casing 10 is partitioned into three compartments by left and right partition walls 14 and 16. A rotary drum 18 is mounted between the partition walls 14 and 16 and held horizontally at the front side of the casing 10. A suction fan 20 is contained in the left compartment and a air blowing fan 22 is contained in the right compartment. A film unit 24 is mounted on the top face of the casing 10. FIG. 4 further shows a document sheet feed tray 26, a discharge tray 28 and an operation panel 30.

Figure 2:
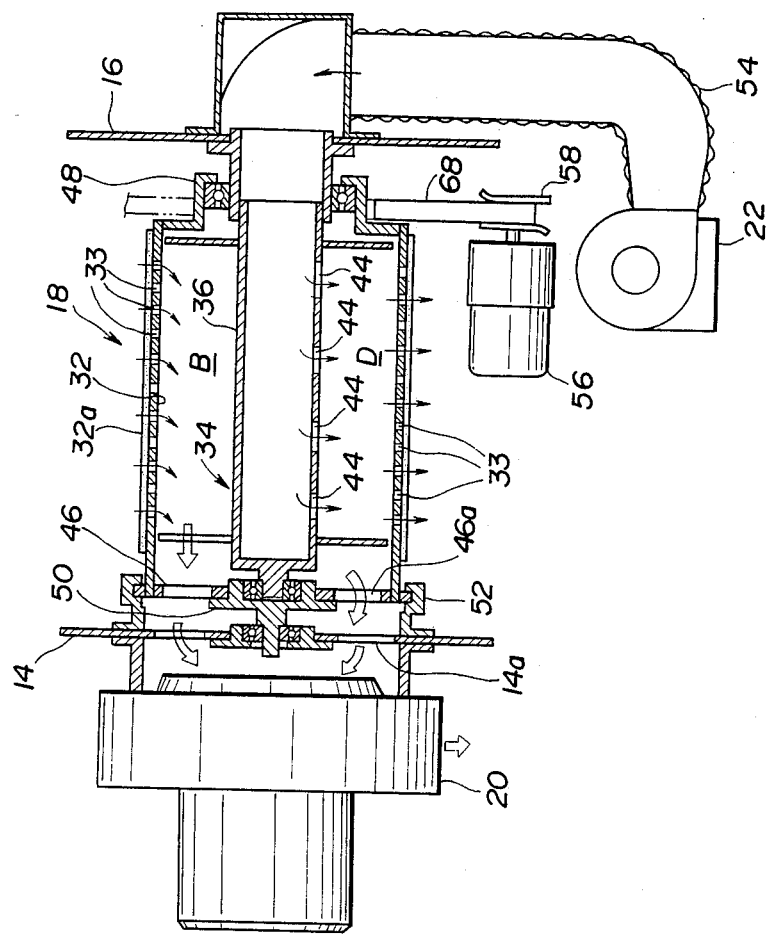
FIG. 2 is a sectional view taken along line II—II of FIG. 1, showing the structure of the rotary drum.
Figure 3:
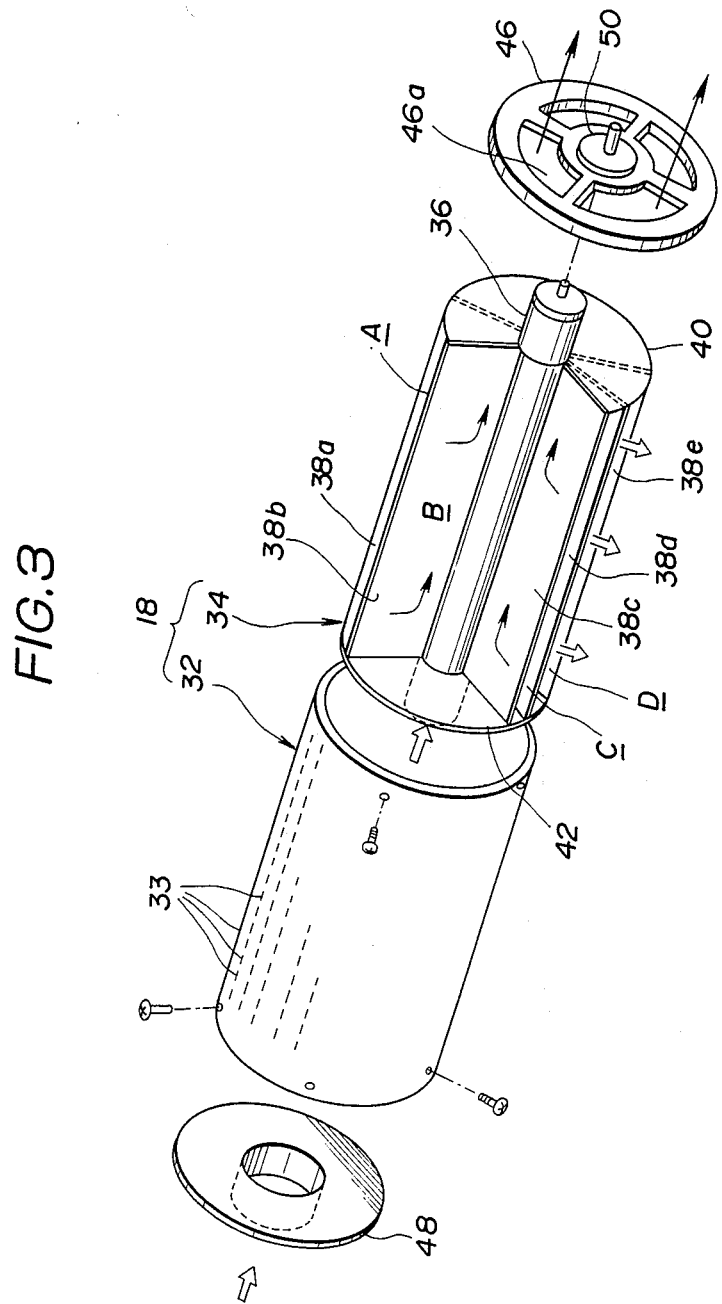
FIG. 3 is a perspective view showing the rotary drum in the exploded condition.

The detailed construction of the rotary drum 18 is shown in FIGS. 2 and 3. As shown, the rotarY drum 18 comprises a metal hollow cylinder 32 formed with multiple through-holes 33 (each having a diameter of about 2 to 7 mm) and a partition assembly 34 contained in the hollow cylinder 32 and partitioning the interior of the hollow cylinder 32 into plural chambers. It is desirous that the outer periphery of the cylinder 32 is applied with an air-permeable thin filter 32a made of a porous filter (for example, a filter available under the Trade Name of Vileen HP-21), cloth, paper or non-woven cloth. The partition assembly 34 is composed of a small diameter tube 36 having one end closed, five radial partition plates 38a to 38e and two side plates 40, 42 fixed to the axial end faces of the partition plates 38a to 38e. As a result, four chambers A, B, C and D enclosed by the side plates 40, 42 and partition plates 38a to 38e and each having a peripheral opening are defined in the assembly 34. The portion of the segment of the side plate 40 at the closed end of the small diameter tube 36 is cut away to subtend the chamber B which forms a sucking portion as a suction means. Multiple through-holes 44 are provided through the the portion of the small diameter tube 36 facing to the chamber D which forms a stripping portion as a document shipping means (see FIG. 2).

The assembly 34 is inserted into the metal cylinder 32 and fixed at the position close to the front side of the casing 10. The closed end of the small diameter tube 36 is carried by the end plate 46 fixed to the matal cylinder 32, and the opposed end of the assembly 34, i.e. the outer periphery of the open end of the small diameter tube 36, is carried by an end plate 48 fixed to the metal cylinder 32. The open end of the small diameter tube 36 projects through the end plate 48 and is fixed to the right partition wall 16 in the casing 10. The end plate 46 is carried by the left partition wall 14. In detail, a bearing cap 50 is fixed to the end plate 46, the cap 50 carries the closed end of the small diameter tube 36, and the cap 50 is carried by the partition wall 14. As a result, the assembly 34 is fixedly secured, and the metal cylinder 32 is rotatable coaxially with the assembly 34. The edges of the partition plates 38a to 38e and side plates 40 and 42 are close to the inner periphery of the metal cylinder 32, so that the gaps between the inner periphery of the cylinder 32 and the edges of the partition plates are so small as to prevent leakage of air theretrough. The end plates 46, 48 are attached to the metal cylinder 32 by screws. The assembly 34 is fixed at the position so that the chamber B serving as the sucking section occupies the upper left segment of the cylinder 32 as shown in FIG. 1.

The suction fan 20 is mounted to the partition wall 14 so that it opposes to the rotary drum 18, and it sucks air in the chamber B through windows 46a and 14a provided respectively through the end plate 46 and the partition wall 14. The gap between the end plate 46 and the partition wall 14 are covered by a sealing cylinder 52 mounted to the partition wall 14 so that the gap is air-tightly sealed. For this purpose, a labyrinth seal or lip seal may be used. The chamber B is thus maintained at a reduced pressure, and air is flown through the through-holes 33 of the metal cylinder 32 and the air-permeable thin film 32a.

The discharge port of the air blowing fan 22 is connected through a duct 54 to the open end of the small diameter tube 36. Air blown from the air blowing fan 22 is introduced into the small diameter tube 36 of the assembly 34, and then fed through the through-holes 44 to the chamber D. Air in the chamber D is discharged through the through-holes 33 of the metal cylinder 32 and the air-permeable thin film 32a to the outside of the cylinder 32.

Figure 1:
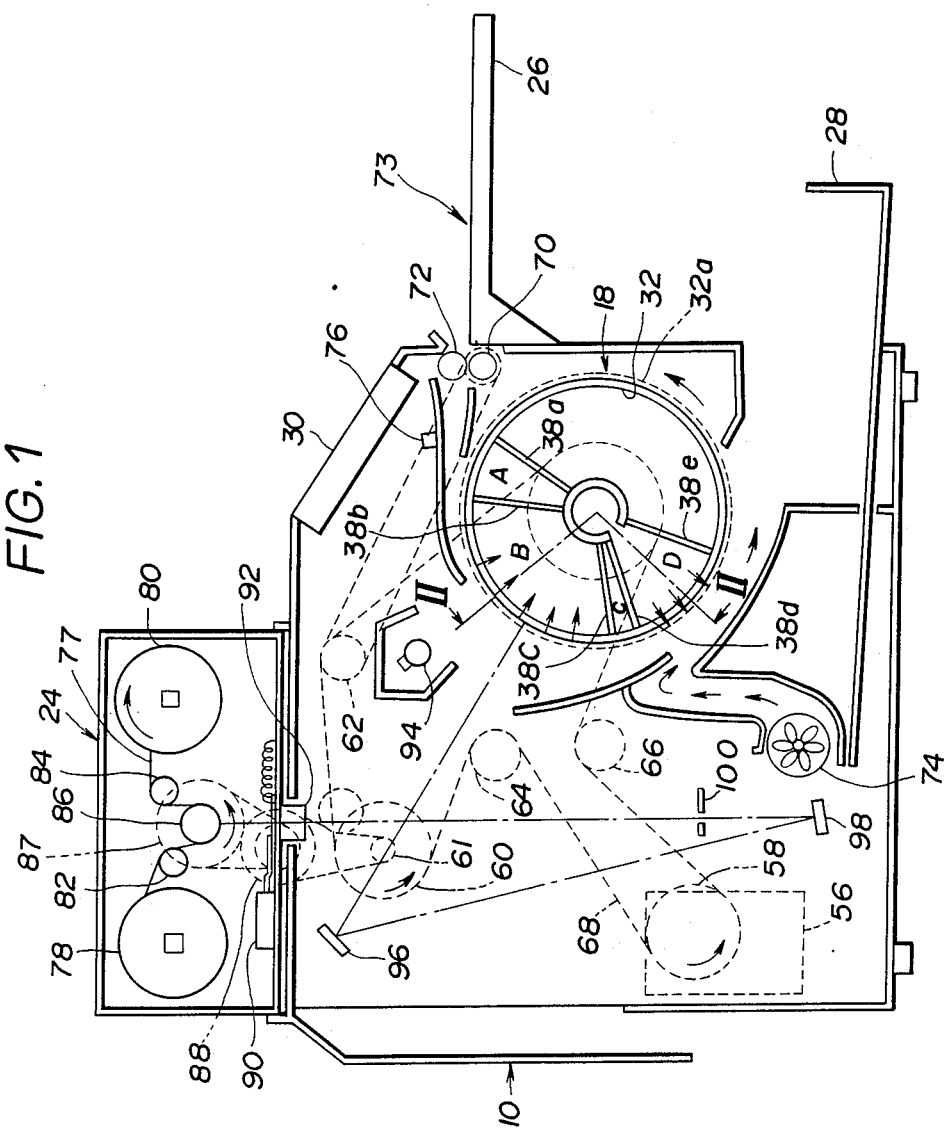
FIG. 1 is a sectional view of an embodiment of this invention.

When an operation switch in the operation panel 30 is pressed down, the metal cylinder 32 is actuated by an electric motor 56 to rotate in the counter-clockwise direction when viewed in FIG. 1. In detail, a plain belt 68 is spread over the pulleys 64, 66 of the motor 56 and the pulley portion integrally molded on the end plate 48 of the rotary drum 18 (see FIG. 2), so that the cylinder 32 is rotated by the belt 68. A feed roller 70 rotatably contacts with a contact roller 72, and the feed roller 70 is driven by a pulley 62. A document sheet supplied from the feed tray 26 is grasped between the rollers 70 and 72 to be led on the rotary drum 18. These roller 70 and 72 together with the feed tray 26 constitute means 73 for feeding a document sheet to the rotary drum 18.

Since the chamber B of the rotary drum 18 is sucked to be maintained at a reduced pressure, the document sheet is sucked by the reduced pressure and sticked onto the outer periphery of the cylinder 32. The document sheet is then conveyed while it is sticked to the cylinder 32. When the leading end of the document sheet comes to the position facing to the chamber D where air is blown from, the surface of the cylinder 32, the document sheet is stripped off from the rotary drum 18 and carried by the blowing air to be discharged to the discharge tray 28. At the outer periphery vicinal to the chamber D, addition air is flown from a sheet discharge fan 74 in the direction to the sheet discharge tray 28 to facilitate smooth discharge and stack of the document sheets. The sheet discharge fan 74 also serves to take air from the neighborhood of a second reflector 98, which will be described hereinafter, to prevent sticking of dust on the second reflector 98. As the document sheet comes above the cylinder 32, it is sensed by a document sensor 76 (see FIG. 1) to initiate photographing operation. A reflector type light sensor may be used as the sensor 76.

The film unit 24 comprises a feed reel 78 for feeding a film 77, a take-up reel 80, guide rollers 82, 84 disposed between the feed reel 78 and the take-up reel 80, and a photographing roller 86. A large diameter pulley 87 is disposed coaxially with the photographing roller 86 so that they are connected or disconnected by a manually operated clutch. The large diameter pulley 87 is driven through a reduction pulley 88 by a small pulley 61 coaxial with the pulley 60. The pulley 60 is connected with and disconnected from the small pulley 61 by an electromagnetic clutch. When the electromagnetic clutch is connected, the large diameter pulley of the reduction pulley 88 is driven by the small diameter pulley 61 of the pulley 60, and the small diameter pulley of the reduction pulley 88 drives the photographing roller 86 through a belt 68. The reduction pulley 88 and the large diameter pulley 87 are disposed within the casing 10, whereas the photographing roller 86 coaxial with the large diameter pulley 87 is contained in the film unit 24. The film unit 24 is detachably mounted on the casing 10, and when it is mounted on the position as shown in FIGS. 1, 4 and 5, the photographing roller 86 and the large diameter roller 87 are positioned coaxially with each other so that they are connected by the manually operated clutch. By connecting or disconnecting the electromagnetic clutch on the pulley 60, the film 77 may be moved or stopped. The initiation and termination of movement of the film 77 are in synchronism with the initiation and termination of movement of the document sheet carried by the rotary drum 18. The moving speed of the film 77 may be determined depending on the reduction rate of the photographed image, for example, the moving speed of the film is set to 1/24 of the peripheral speed of the rotary drum 18 when the reduction rate is 1/24.

An electromagnetic shutter 90 and a photographing lens 92 are disposed below the photographing roller 86.

According to this invention, an optical system is disposed in an elongated space below the film unit 24, the elongated space extending substantially vertically behind the rotary drum 18.

Reference numeral 94 designates a light source and irradiates the outer periphery of the chamber B of the cylinder 32 on which the document sheet is fixedly carried by suction force. A first reflector or mirror 96 is disposed at the upper rear corner of the casing 10, and a second reflector or mirror 98 is disposed beneath the lens 92 of the film unit 24 and at a lowest location in the casing 10. The image of the document sheet is irradiated by the light source 94. The image-bearing light, that is the optical image of the document, is reflected by the first mirror 96 positioned obliquely above the rotary drum 18 and then reflected by the second mirror 98 positioned at the lowest location in the casing 10 to be led to the lens 92. The optical path from the second mirror 98 to the lens 92 is substantially vertical and the light path is lengthened by the maximum utilization of the space in the casing 10. A slit 100 is disposed between the second mirror 98 and the lens 92.

The operation of this embodiment will now be described. When in electric power source is thrown in by manipulating the operation panel 30, fans 20, 22 and 74 are actuated. The chamber B in the rotary drum 18 is maintained at reduced filter and air is sucked through the cylinder 32 and the thin film 32a applied thereon, whereas the pressure in the chamber D becomes higher than the atmospheric pressure so that air is blown through the thin film 32a within the zone of chamber D. When a photographing switch in the operation panel 30 is pressed down, the motor 56 is actuated to rotate the drum 18. When a document sheet is supplied from the document feed tray 26, the document sheet is fed by the rollers 70, 72 above the drum 18. At this time, the fore end and aft end of the document sheets are sensed by a sensor 76 to connect and disconnect the electromagnetic clutch to initiate or terminate feeding of the film 77. The shutter 90 is opened only when the document sheet occupies the image reading position to allow the light bearing the image of the document sheet to put into the film 77.

The operations of the sensor 76, film 77 and shutter 90 are as follows. When the sensor 76 senses the leading end of the document sheet, the electromagnetic clutch is connected to move the film 77, and the shutter 90 is opened with a slight time lag after the film is begun to move. When the sensor 76 senses the aft end of the document sheet, the shutter 90 is closed, and the film 77 is stopped after a slight time lag.

The document sheet is sucked on the surface of the drum 18 when it comes to the zone of the chamber B, and moves together with the hollow cylinder 32 to be photographed. Since air is not flown in or out of the chamber C, the document sheet is not sucked within the zone of chamber C. This zone forms a buffer zone or serves as a buffer means to allow the sheet to be ready for stripping in the next zone of chamber D. When the document sheet comes to the zone of the chamber D, the document sheet is stripped from the drum surface by the air blowing through the drum and delivered smoothly by the air flow discharged from the fan 74.

Since the hollow cylinder 32 is rotated, dusts are removed in the zone of the chamber D even if dusts are attached to the surface of the drum 18 in the zone of the chamber B. Accordingly, clogging of the thin filter 32a is obviated.

Since the chamber C serves as the buffer means and is disposed between the chamber B defining the suction means and the chamber D defining the document, stripping means, air flowing from the surface of the thin filter 32a in the zone defined by the chamber D does not flow through the thin filter 32a into the chamber B, and thus there is no risk that the document sheet stripped in the zone of the chamber D is folded toward the chamber B.

Figure 6:
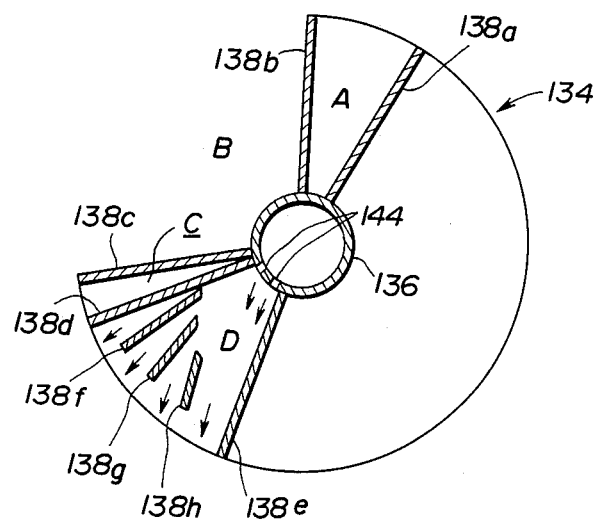
FIG. 6 is a sectional view showing another embodiment of the partition assembly in the rotary drum.

FIG. 6 is a sectional view of another embodiment of the partition assembly 134. In this embodiment, air guide plates 138f, 138g and 138h are disposed within the chamber D defining the stripping zone so that the flow rate of air blown through the surface of the cylinder (not shown) is gradually increased along the direction of rotation of the cylinder. In lieu of, or in addition to, the air guide plates 138f, 138g and 138h, the through-holes 144 of the small diameter tube 136 may be inclined so that air is ejected obliquely toward the direction of rotation.

When the flow rate of air blown from the stripping zone is gradually increased along the direction of rotation, short circuiting of the air flow blown from the drum surface of chamber D defining the stripping zone to the drum surface of chamber B defining the sucking zone is prevented. Thus, the disorder that the document sheet stripped off in the zone of chamber D is folded toward the chamber B is obviated. Meanwhile, reference numerals 136a to 136e designate partition plates which correspond respectively to the partition plates 36a to 36e shown in FIG. 1.

As will be apparent from the foregoing, the document sheet is conveyed while being sticked to the surface of the cylinder by the reduced pressure in the sucking zone, and sucking of the document sheet is ceased at the buffer zone which is disposed downstream of the sucking zone, and then the document sheet is stripped from the surface of the cylinder by air blow in the stripping zone disposed at the downstream of the buffer zone. The document sheet is smoothly delivered while sticking to the sucking zone of the cylinder, the sucking force being released in the buffer zone to be ready for stripping, and then smoothly stripped off in the stripping zone. By the provision of the buffer zone which serves not to apply the document sheet with an abrupt pressure change between the sucking zone and the stripping zone, jamming, breakdown, crimping or skew of the document sheet is effectively prevented Even a thin sheet, a small size sheet or a sheet which is apt to generate static electricity can be smoothly conveyed, according to this invention. Since the document sheet is conveyed while being closely sticked to the cylinder, the conveying speed is stabilized to improve the quality of the photographed image on the film.

By the application of an air-permeable thin film, such as a filter, on the rotary drum the document sheet sucked on the surface of the drum is applied with uniform sucking pressure to prevent creases or undulations of the document sheet. Even if the diameter of each through-hole of the cylinder is large or the spacings between respective through-holes are large, the document sheet can be held with its surface smoothly by the application of such air-permeable thin film to effect photographing under good condition.

When the flow rate of air in the stripping zone is gradually increased along the direction of rotation, short-circuiting of air from the drum surface of the stripping zone to the drum surface of the sucking zone is prevented to ensure smooth conveyance of particularly thin document sheet.

According to a further aspect of the invention, the rotary drum is disposed in the frontal position in the casing, the film unit being disposed at the upper rear location of the casing, and the optical system is disposed at the position behind the rotary drum and beneath the film unit to make maximum use of the elongated space to provide a sufficiently long light path. Moreover, since the document feed and discharge ports are disposed at the front side of the casing, the optical system is remote from the document feed and discharge ports to be isolated from the lights entering from the outside of the casing. Accordingly, particular measure for preventing entrance of the outside light is dispensed with, so that the casing has a simple construction.

The rotary drum is disposed in the frontal position in the casing, the film unit being disposed at the upper rear location of the casing, and the optical system comprises a first reflector disposed at the upper rear corner of the casing and a second reflector disposed beneath the film unit and positioned at the lowest location of the casing. The vertical elongated space behind the rotary drum is utilized at the maximal extent to provide a sufficiently long light path. The size of the total system can be decreased, accordingly.

The image on the document sheet is read during the document sheet is conveyed on the arc segment remoter from the front wall of the casing and taken the document sheet is stripped from the lowest portion on the arc segment of the rotary drum to be discharged to the lower portion of the front wall of the casing. Accordingly, the document sheet is fed with the image-bearing face held upside so that the document sheet is fed while observing the image to be photographed to allow the operator to check the document sheet.

What is claimed is:

1. In a rotary camera for photographing an original image on a document sheet so that a photographed image is formed on a frame of a microfilm roll, wherein the initiation and termination of movement of the microfilm roll is synchronized with the initiation and termination of photographing of the document sheet and wherein the microfilm take-up speed is maintained at a pre-set reduction ratio relative to the conveyed speed of the document sheet, an improved rotary camera which comprises:
   (a) a rotary drum for conveying said document sheet and rotating at a certain circumferential speed;
   (b) a film unit containing therein said microfilm roll; and
   (c) an optical system for exposing said image on said document sheet to light and leading the image-bearing light through an optical path onto said frame of said microfilm roll;
   said rotary drum comprising:
   (i) a hollow cylinder having an outer periphery provided with multiple small through-holes; and
   (ii) suction means for sucking air through said multiple through-holes, said suction means providing the primary force for holding said document sheet exposed to light closely fitted over the outer periphery of said cylinder.

2. In a rotary camera for photographing an original image on a document sheet so that a photographed image is formed on a frame of a microfilm roll, wherein the initiation and termination of movement of the microfilm roll is synchronized with the initiation and termination of photographing of the document sheet and wherein the microfilm take-up speed is maintained at a pre-set reduction ratio relative to the conveyed speed of the document sheet, an improved rotary camera which comprises:
   (a) a rotary drum for conveying said document sheet and rotating at a certain circumferential speed;
   (b) a film unit containing therein said microfilm roll; and
   (c) an optical system for exposing said image on said document sheet to light and leading the image-bearing light through an optical path onto said frame of said microfilm roll;
   said rotary drum comprising:
   (i) a hollow cylinder having an outer periphery provided with multiple small through-holes; and
   (ii) suction means for sucking air through said multiple through-holes so that at least a zone of said document sheet exposed to light is closely fitted over the outer periphery of said cylinder,
   wherein a dense and air-permeable filter is applied over the outer periphery of said hollow cylinder.

3. In the rotary camera for photographing an original image on a document sheet so that a photographed image is formed on a frame of a microfilm roll, wherein the initiation and termination of take-up of the microfilm roll is synchronized with the initiation and termination of photographing of the document sheet and wherein the microfilm take-up speed is maintained at a pre-set reduction ratio relative to the conveyed speed of the document sheet, an improved rotary camera which comprises:
   (a) a rotary drum for conveying said document sheet and rotating at a certain circumference speed;
   (b) a film unit containing therein said microfilm roll; and
   (c) an optical system for exposing said image on said document sheet to light and leading the image-bearing light through an optical path onto said frame of said microfilm roll;
   said rotary drum comprising:
   (i) a hollow cylinder having an outer periphery provided with multiple small through-holes;
   (ii) suction means for sucking air through said multiple through-holes so that at least a zone of said document sheet exposed to light is closely fitted over the outer periphery of said cylinder; and
   (iii) document stripping means disposed downstream of said suction means for blowing air through said through-holes to strip said document sheet from the outer periphery of said cylinder.

4. The rotary camera of claim 3, further comprising buffer means disposed downstream of said suction means and upstream of said document stripping means, said buffer means defining a zone within which passage of air through said multiple through-holes is restricted.

5. The rotary camera of claim 4, wherein said buffer mans defines a zone within which passage of air is blocked substantially completely.

6. The rotary camera of claim 4, wherein the rate of air blown from said document stripping means is gradually increased as the document moves downwardly from said buffer means.

7. The rotary camera as claimed in any of claims 3 to 6, wherein a dense and air-permeable thin film is applied over the outer periphery of said hollow cylinder.

8. In the rotary camera for photographing an original image on a document sheet so that a photographed image is formed on a frame of a microfilm roll, wherein the initiation and termination of take-up of the microfilm roll is synchronized with the initiation and termination of photographing of the document sheet and wherein the take-up speed of the microfilm roll is maintained at a pre-set reduction rate relative to the circumferential speed of the document sheet, an improved rotary camera which comprises:

(a) a casing of substantially rectangular parallelepiped shape and having top, bottom, front, rear and side walls;
(b) a rotary drum disposed adjacent to the front wall of said casing for conveying said document sheet while retaining the document sheet closely sticking to the outer periphery thereof;
(c) a film unit containing therein said microfilm roll, said film unit being mounted on the rear side of the top wall of said casing; and
(d) an optical system for exposing said image on said document sheet to light and leading the image-bearing light through an optical path onto said frame of said microfilm roll, said optical system being disposed in said casing at a position below said film unit and rearward of said rotary drum;
whereby said document sheet is supplied and discharged from the front side of said casing and the original image thereon is photographed when it comes to a position on rear half arc of said rotary drum.

9. The rotary camera of claim 8, wherein said optical system includes a first reflector disposed at the upper rear corner of said casing, and a second reflector disposed beneath said film unit and at the lowest location in said casing, said image-bearing light being passed from the surface of said document sheet through said first reflector and then through said second reflector into said film unit.

10. In the rotary camera for photographing an original image on a document sheet so that a photographed image is formed on a frame of a microfilm roll, wherein the initiation and termination of take-up of the microfilm roll is synchronized with the initiation and termination of photographing of the document sheet and wherein the take-up speed of the microfilm roll is maintained at a pre-set reduction rate relative to the circumferential speed of the document sheet, an improved rotary camera which comprises:
(a) a casing of substantially rectangular parallelepiped shape and having top, bottom, front, rear and side walls;
(b) a rotary drum disposed adjacent to the front wall of said casing for conveying said document sheet while retaining the document sheet close to the outer periphery thereof by suction force;
(c) means for feeding said document sheet to said rotary drum so that the leading end of document sheet abuts against the uppermost periphery of said rotary drum;
(d) a film unit containing therein said microfilm roll, said film unit being mounted on the rear side of the top wall of said casing; and
(e) an optical system for exposing said image on said document sheet to light and leading the image-bearing light through an optical path onto said frame of said microfilm roll, said optical system being disposed in said casing at a position below said film unit and rearward of said rotary drum;
wherein said document sheet is supplied with the image-bearing face held upside and discharged from the front side of said casing and the original image thereon is read when it comes to position on rear half arc of said rotary drum.

* * * * *